(12) United States Patent
Wong et al.

(10) Patent No.: US 11,350,339 B1
(45) Date of Patent: May 31, 2022

(54) TRANSMITTING ANNOUNCEMENT MESSAGES BETWEEN NETWORK DEVICES AND BUILDING NETWORK CONNECTIVITY GRAPHS

(71) Applicant: Amazon Technologies, Inc., Seattle, WA (US)

(72) Inventors: Chiu Ngok Eric Wong, San Jose, CA (US); Choong Ryeol Lee, San Jose, CA (US); Shashi Bushan Pavuluri, San Jose, CA (US); Karan Dilip Pradhan, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 16/883,622

(22) Filed: May 26, 2020

(51) Int. Cl.
*H04W 40/24* (2009.01)

(52) U.S. Cl.
CPC ....... *H04W 40/248* (2013.01); *H04W 40/246* (2013.01)

(58) Field of Classification Search
None
See application file for complete search history.

(56) References Cited

U.S. PATENT DOCUMENTS

| | | | |
|---|---|---|---|
| 10,805,902 B1* | 10/2020 | Hsu | H04B 17/318 |
| 11,051,229 B1* | 6/2021 | Chu | H04W 40/248 |
| 2019/0069152 A1* | 2/2019 | Bhaumik | G08B 21/22 |
| 2020/0389869 A1* | 12/2020 | Patil | H04W 40/22 |

* cited by examiner

*Primary Examiner* — Brian S Roberts
(74) *Attorney, Agent, or Firm* — Lee & Hayes, P.C.

(57) ABSTRACT

A first network device wirelessly transmits announcement messages in quick succession over multiple channels that represent normal operating channels of other network devices. The other network devices receive one of the announcement messages over their respective operating channels, and then send a message to one or more servers indicating that one of the announcement messages has been received. Various parameters and information related to the received announcement message, such as RSSI, SNR, and the contents of the announcement message, are included in the message sent to the one or more servers by each of the other network devices. The one or more servers then incorporate information in the messages sent from the other network devices into a network connectivity graph or table.

20 Claims, 9 Drawing Sheets

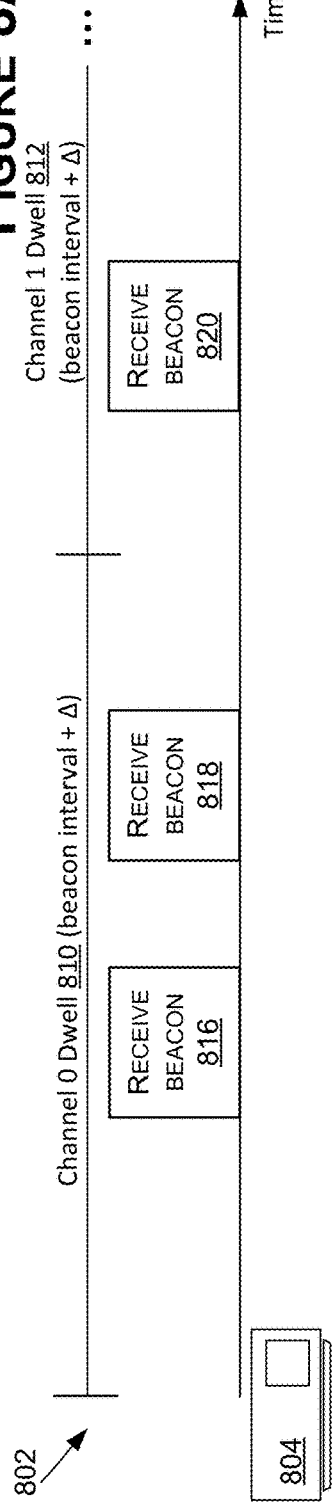
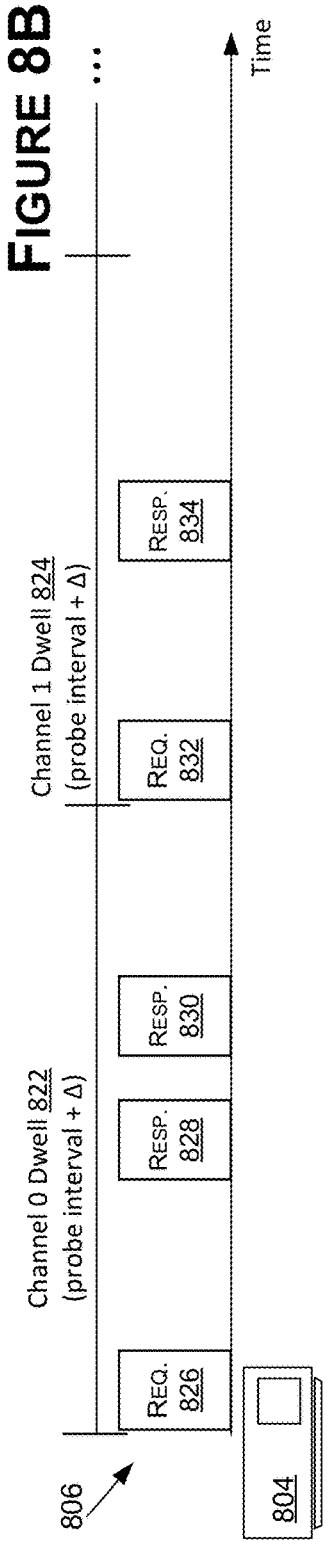
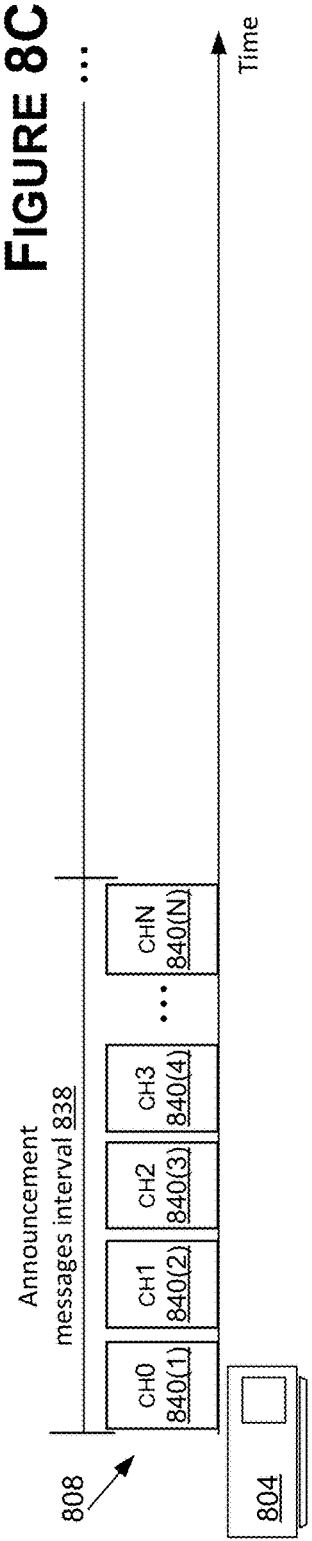

US 11,350,339 B1

TRANSMITTING ANNOUNCEMENT MESSAGES BETWEEN NETWORK DEVICES AND BUILDING NETWORK CONNECTIVITY GRAPHS

BACKGROUND

Various devices may be used as part of a home security and monitoring system (e.g., motion sensors, bridge network extenders, cameras or other recording and communication devices, smoke detectors, automation devices, smart-home hub devices, pet trackers, lights, virtual assistants, etc.). These devices may be placed in different locations inside or outside of a home, or in any location on a property sought to be protected. These devices may communicate with one another and with other devices such as servers via a wireless network (e.g., a wide area network (WAN)). Endpoint devices that are part of a home security and monitoring system may not be able to communicate directly over the wireless network, but rather are paired to communicate with a gateway device (referred to herein as a network device) that serves as a gateway for an endpoint device to communicate over the wireless network. An endpoint device may be paired with and communicate with the network device over a different wireless protocol than a wireless protocol used in the wireless network.

BRIEF DESCRIPTION OF THE DRAWINGS

FIGS. 8A-8C are diagrams illustrating and comparing example methods for transmitting announcement messages.

DETAILED DESCRIPTION

Figure 1:
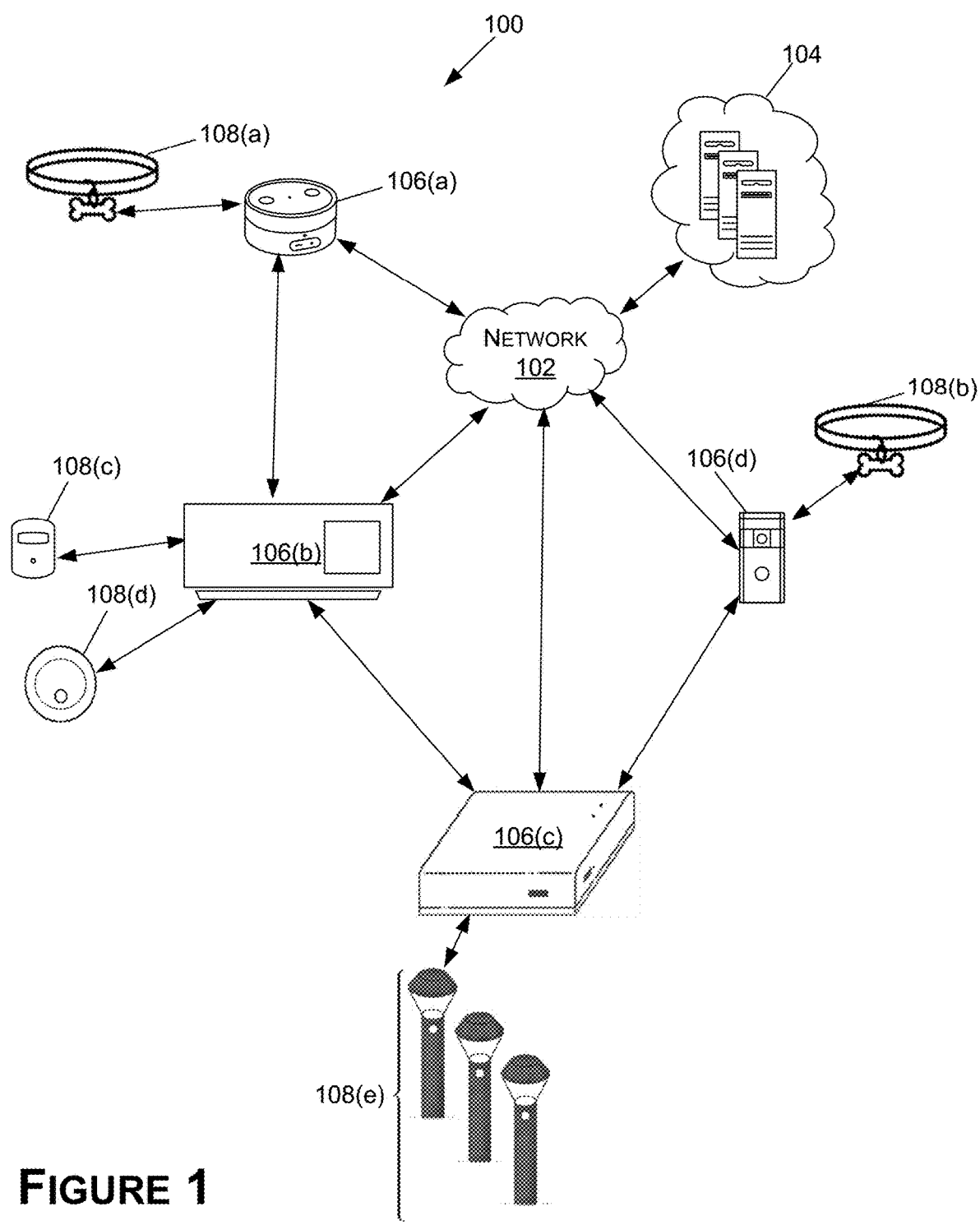
FIG. 1 is a diagram of an example system according to various aspects of the present disclosure.

FIG. 1 is a diagram of an example system 100 that includes a network 102, one or more servers 104, network devices 106(a)-106(d), and endpoint devices 108(a)-108(e), including pet locating devices 108(a), 108(b), sensors (e.g., motion sensors, smoke detectors) 108(c), 108(d), and automation devices (e.g., lights, door locks, smart appliances) 108(e). In various embodiments, the network devices 106 may be any of a virtual assistant (VA) device (e.g., the network device 106(a)), a hub device of a security/alarm or home automation system (e.g., the network device 106(b)), a bridge device for extending range of a wireless network (e.g., the network device 106(c)), an audio/video recording and communication device (A/V device) such as a video doorbell (e.g., the network device 106(d)), etc. In the example of FIG. 1, and as described in detail below, the devices 106 may wirelessly transmit announcement messages to one another, and/or may transmit messages to the server(s) 104, according to various aspects of the present disclosure.

The network devices 106 have the hardware and functionality to communicate with various endpoint devices (e.g., the endpoint devices 108), as well as communicate over the network 102. Each of the endpoint devices 108 are paired with one or more of the network devices 106 so that the endpoint devices 108 may be communicated with via the network devices 106. For example, the network devices 106 may have the hardware and functionality to communicate with the server(s) 104 over the network 102 by communicating with a Wi-Fi network within a home, and the network devices 106 may also have the hardware and functionality to communicate with the endpoint devices 108 over a different wireless protocol, such as a low power 900 megahertz (MHz) band of channels. The endpoint devices 108 may not be capable of communicating directly over the Wi-Fi network, so their communications pass through the respective network devices 106 to which the endpoint devices 108 are paired.

In various embodiments, other wireless protocols may be used for the network devices 106 to communicate over the network 102 and/or with one another. In various embodiments, the network devices 106 may also communicate with the network 102 and/or with one another over wired connections, such as through an Ethernet cable connecting one or more of the network devices 106 to a wired or wireless router in connection with the network 102. The network devices 106 may also communicate with the network 102 and/or with one another over a combination of wired and wireless network components. In various embodiments, other wireless protocols and/or wired connections may also be used for communication between the network devices 106 and the endpoint devices 108. In various embodiments, the network devices 106 may communicate with one another over the same wireless protocol (e.g., a 900 MHz band of channels) that is used to communicate with the endpoint devices 108. Accordingly, the network devices 106 have multiple communication interfaces for communicating over the network 102 and with the endpoint devices 108. Other wireless or wired communication protocols that may also be used in various embodiments include, for example and without limitation, X10, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

Accordingly, in various embodiments, the network 120 may be any wireless network, any wired network, or a combination thereof, configured to operatively couple the modules, devices, components, and/or systems as illustrated in FIG. 1. For example, the network 102 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The network device 106(*a*) may be a virtual assistant (VA) device that receives voice commands, processes the voice commands to determine one or more actions and/or responses, and performs the one or more actions and/or responses, such as to activate, change, and/or retrieve the status of one or more of the endpoint devices 108. The network device 106(*b*) may be a hub device that facilitates communication with and control of endpoint devices 108. For example, the network device 106(*b*) may be a component of a security system and/or a home automation system installed at a location (e.g., a property, a premises, a home, a business, etc.). In some embodiments, the network device 106(*b*) may communicate through the network 102 with a client device (e.g., a smartphone, tablet, laptop, desktop computer, etc.) so that aspects of a security or home automation system (e.g., the endpoint device 108) may be remotely controlled by the client device.

The network device 106(*c*) may be a bridge device that bridges communications between the network 102 and endpoint devices (e.g., the pathway lights 108(*e*)), where the endpoint devices use a different communication technology, protocol, or format than other devices in the network 102. The bridge device may, for example, include a first radio (e.g., a WiFi radio) for communicating with the network 102, and include a second radio (e.g., a 900 MHz radio) for communicating with the pathway lights 108(*e*). The network device 106(*d*) may be a video doorbell A/V device that can record audio and/or video of a person upon pressing of a doorbell button or upon detection of motion. The network device 106(*d*) may also transmit audio and/or video via the network to a client device so that, for example, a user may communicate with a person at their front door using the client device and the network device 106(*d*).

The endpoint devices 108(*a*) and 108(*b*) may be pet locator tags that are capable of passive or active communication with the network devices 106. The pet locator tags may be placed on a pet (or on any other object) to determine and/or track a location of the pet. The location of a pet locator tag may be determined, in part, based on network devices that the pet locator tag communicates with. If a pet locator tag goes missing, other network devices not ordinarily paired with the pet locator tag may be instructed via the network 102 to attempt to communicate with the pet locator tag to locate the pet locator tag.

The endpoint devices 108(*c*) and 108(*d*) may be sensors. For example, the endpoint device 108(*c*) may be a motion sensor that detects motion for a security system, for control of a motion activated light, etc. The endpoint device 108(*d*) may be a smoke detector, carbon monoxide detector, or some other type of sensor. The endpoint device 108(*e*) may be set of pathway lights. The network device 106(*c*) may be able to directly communicate with each of the pathway lights, or may communicate with a first pathway light, and the other pathway lights are communicated with via the first pathway lights. In any case, the pathway lights may be controlled via communications received via the network device 106(*c*).

The endpoint devices 108 are not in direct communication with the network 102 in FIG. 1. Rather, the endpoint devices 108 communicate with the network 102 via the network devices 106. Each of the endpoint devices 108 in FIG. 1 is paired with a single one of the network devices 106. However, in various embodiments, the endpoint devices 108 of FIG. 1 may be capable of wirelessly communicating with more than one of the network devices 106 when multiple of the network devices 106 are within communication range. In various embodiments, the endpoint devices 108 do not receive or transmit announcement messages as described herein.

In an example embodiment, the network device 106(*b*) of the network devices 106 may transmit announcement messages, and any of the other network devices 106 may receive one of those announcement messages. Upon receipt of one of the announcement messages from one of the network devices 106, the network device 106(*a*) and the network device 106(*c*) that are within range of the network device 106(*b*) may receive an announcement message. Each of the network devices 106(*a*) and 106(*c*) may extract information from the announcement message (e.g., a unique identifier of the network device 106(*b*) and an indication of an operating channel of the network device 106(*b*)) and determine further information to include in a message to the one or more servers 104. An example format of an announcement message is further shown in and described with respect to FIG. 6B. The further information may include a modulation type of the received announcement message, a signal power value such as a received signal strength indicator (RSSI) and a signal-to-noise ratio (SNR) of the received announcement message, a time at which the announcement message was received, and a unique identifier of the network device 106(*a*) or 106(*c*) transmitting the message to the server(s) 104. A message to the server(s) 104 may also include information about any endpoint devices connected to a given network device 106(*a*) or 106(*c*). For example, for the network device 106(*a*), a unique identifier associated with the endpoint device 108(*a*) may be included in the message sent to the server(s) 104, and the server(s) 104 may use this information for more efficient message routing through the system 100, as described in further detail below.

The server(s) 104 may presume that, after receiving messages from the network devices 106(a) and 106(c) based on announcement messages received from the network device 106(b), that communication routes between the network device 106(b) are bidirectional with each of the network devices 106(a) and 106(c). In other words, if the network devices 106(a) and 106(c) are able to receive communications from the network device 106(b), the server(s) 104 may presume that the network device 106(b) can likewise receive communications from each of the network devices 106(a) and 106(c). In various embodiments, each of the network devices 106 may transmit announcement messages, and any network devices 106 that receive the announcement messages may send a message to the server(s) 104. If, for example, the network device 106(c) transmits announcement messages, each of the network devices 106(b) and 106(d) may receive one of the announcement messages. In such an example, the server(s) 104 may not need to presume that bidirectional communications between the network devices 106(b) and 106(c) are possible, because a message may be received from both of the network devices 106(b) and 106(c) indicating that an announcement message has been received by both of the network devices 106(b) and 106(c) from each other.

As a result of the various network devices 106 transmitting announcement messages, and the network devices 106 that receive them sending messages to the server(s) 104, the server(s) 104 have information that may be used to build, update, or otherwise incorporate into a network connectivity graph or table, and the server(s) 104 may leverage the network connectivity graph or table to efficiently route communications in the system 100. An example network connectivity graph is shown in and described with respect to FIG. 3.

For example, a communication intended for the network device 106(c) may be routed through any of the network devices 106(a), 106(b), and/or 106(d), because they are all capable of communicating directly or indirectly with one another without passing a communication through the network 102. For example, a communication from the server(s) destined for the network device 106(c) may be sent straight to the network device 106(c) because the network device 106(c) is in communication with the network 102. However, if there is an outage of the connection between the network device 106(c) and the network 102, a communication may be routed through either of the network device 106(b) or the network device 106(d) to pass on to the network device 106(c). If there is an outage of the connections between the network 102 and each of the network devices 106(b), 106(c), and the network device 106(d), a communication to any of the network devices 106(b), 106(c), and the network device 106(d) may be routed through the network device 106(a). For example, a communication may be routed from the server(s) 104 through the network 102 to the network device 106(a), then to the network device 106(b), and finally to the network device 106(c). In this way, the network connectivity graph or table built by the server(s) 104 may be used to properly route communications if there is an outage in connectivity for a network device. Advantageously, the embodiments described herein therefore provide for systems that have more up-time, providing more security and usability for a user. For example, if there is an outage of internet connectivity at a user's home who has an A/V device (e.g., the network device 106(d)) installed at their front door, an audio/video communication may still be established between the A/V device and a user's electronic device because the communications with the A/V device may be routed through, for example, one or more of the user's neighbor's network devices.

The server(s) 104 may further use the network connectivity graph or table and the information received from the various network devices for other purposes, such as efficiently routing traffic in the system 100. For example, if the connection between the network device 106(b) and the network 102 is down, the server(s) 104 may refer to the network connectivity graph or table to determine that communications for the network device 106(b) may be routed through the network device 106(a) or the network device 106(c). However, the SNR and/or RSSI data received from any of the network devices 106(a), 106(b), and/or 106(c) may indicate that one of the network devices 106(a) or 106(c) may have a stronger or more reliable connection with the network device 106(b). Accordingly, the server(s) 104 may determine how to route communications based on the additional information received in the messages from the network devices of the system 100. In another example, the server(s) 104 may be able to determine an amount of traffic already occurring between the network 102 and each of the network devices 106(a) and 106(c). In such an example, the server(s) 104 may route traffic to the network device 106(b) to whichever of the network devices 106(a) or 106(c) currently has less traffic.

Figure 2:
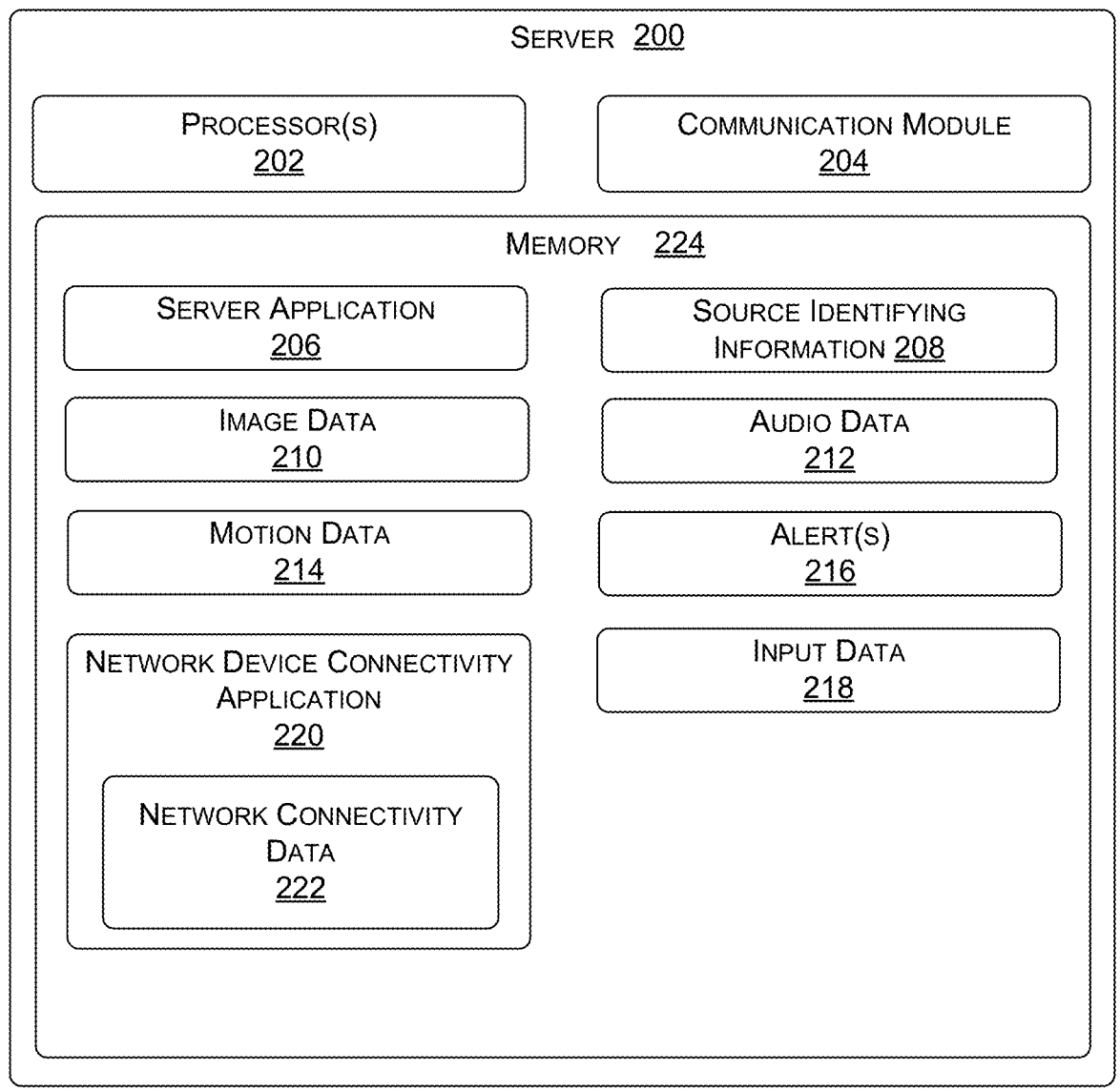
FIG. 2 is a functional block diagram illustrating one example embodiment of a server according to various aspects of the present disclosure.

FIG. 2 is a functional block diagram illustrating one embodiment of a server 200 according to various aspects of the present disclosure. The server 200 is an example of the server(s) 104 (FIG. 1), and may comprise processor(s) 202, a communication module 204, and a memory 224. The communication module 204 may allow the server 200 to access and communicate with devices (e.g., the network devices 106, the endpoint devices 108) connected to the network 102 (e.g., Internet/PSTN).

The processor(s) 202 (alternatively referred to herein as a "CPU," a "controller," and/or a "microcontroller") may comprise an integrated circuit including a processor core, memory, and programmable input/output peripherals. The processor(s) 202 may receive input signals, such as data and/or power, from the network devices 106 and/or the endpoint devices 108, and may perform various functions as described in the present disclosure. For example, the processor(s) 202 may transmit announcement message parameters to the network devices 106, may receive messages from the network devices 106, and/or may build a network connectivity graph or table based on the messages from the network devices 106. The communication module 204 may comprise an integrated circuit including a processor core, memory, and programmable input/output peripherals. The communication module 204 may be operatively connected to the processor(s) 202. In some embodiments, the communication module 204 is configured to handle communication links between the server 200 and other, external devices, external receivers, external transmitters, and/or external transceivers, including the network devices 106, and to route incoming/outgoing data appropriately.

Image data 210 may be stored on the memory 224, which may include image sensor data such as (but not limited to) exposure values and data regarding pixel values for a particular sized grid. The image data 210 may include still images, live video, and/or pre-recorded images and/or video. The image data 210 may be recorded by a camera of an A/V device, such as the network device 106(d). Audio data 212 may also be stored in the memory 224, and may include audio processed by and/or recorded by an A/V device (e.g., the network device 106(d)) or a VA device (e.g., the network device 106(a)). Motion data 214 may also be stored on the memory 224, and may include motion sensor data generated in response to motion events (e.g., from the network device 106(d) and/or the endpoint device 108(c)). For example, the motion data 214 may include an amount or level of a data type generated by the endpoint device 108(c). Motion data 214 may also be generated by a camera (e.g., of the network device 106(d)). In such embodiments, based on a frame by frame comparison of changes in the pixels from the image data 210, it may be determined that motion is present.

Alert(s) 216 may also be stored on the memory 224. Alert(s) 216 may be generated by any of the endpoint devices 108 and/or network devices 106 and transmitted to a client device, the server 200, and/or any of the network devices 106. For example, in response to detecting motion using a camera of the network device 106(d) and/or the endpoint device 108(c), the server(s) 200 may generate and transmit an alert. In some of the present embodiments, the alert may include any of the image data 210, the audio data 212, and/or the motion data 214.

Input data 218 may also be stored in the memory 224. The input data 218 may include data generated in response to an input of a button, such as a button of the network device 106(d). The button may receive an input (e.g., a press, a touch, a series of touches and/or presses, etc.) and may generate the input data 218 in response that is indicative of the type of input.

The memory 224 may also include a server application 206 comprising instructions that the processor(s) 202 execute(s) to receive and/or retrieve the audio data 212, the input data 218, the alert(s) 216, the image data 210, and/or the motion data 214 from any of the endpoint devices 108 and/or the network devices 106. The server application 206 may also configure the processor(s) 202 to transmit (and/or forward) the audio data 212, the input data 218, the alert(s) 216, the image data 210, and/or the motion data 214 to any of the endpoint devices 108, the network devices 106, and/or a client device using the communication module 204.

Although referred to as the server 200 with reference to the processes described herein, the server 200 may additionally, or alternatively, include one or more of the devices from a network(s) of servers/backend devices, such as (but not limited to) one or more remote storage devices (which may be referred to interchangeably as "cloud storage device(s)"), one or more servers, and one or more backend application programming interfaces (APIs). While FIG. 1 illustrates the server(s) 104 and the network 102 as separate components, it is to be further understood that the server 200 may be considered to be components of the network 102. For example, the network 102 may include a data center with a plurality of computing resources used to implement a storage device, one or more servers, and an API. The server(s) 200 may therefore additionally include similar components and functionality as any combination of the network 102 and the server(s) 104 of FIG. 1.

In addition, the server 200 may include a network device connectivity application 220. The network device connectivity application 220 may include instructions executed by the processor(s) 202 for sending parameters for announcement messages and their associated return messages to various devices. The network device connectivity application 220 may also include instructions for building, updating, or otherwise incorporating information received in messages from network devices into a network connectivity graph or table, which may be stored as the network connectivity data 222. As described herein, the network connectivity data 222 (which may be or may include the network connectivity graph or table) may be used to route communications to or between different network devices and/or their endpoint devices.

Figure 3:
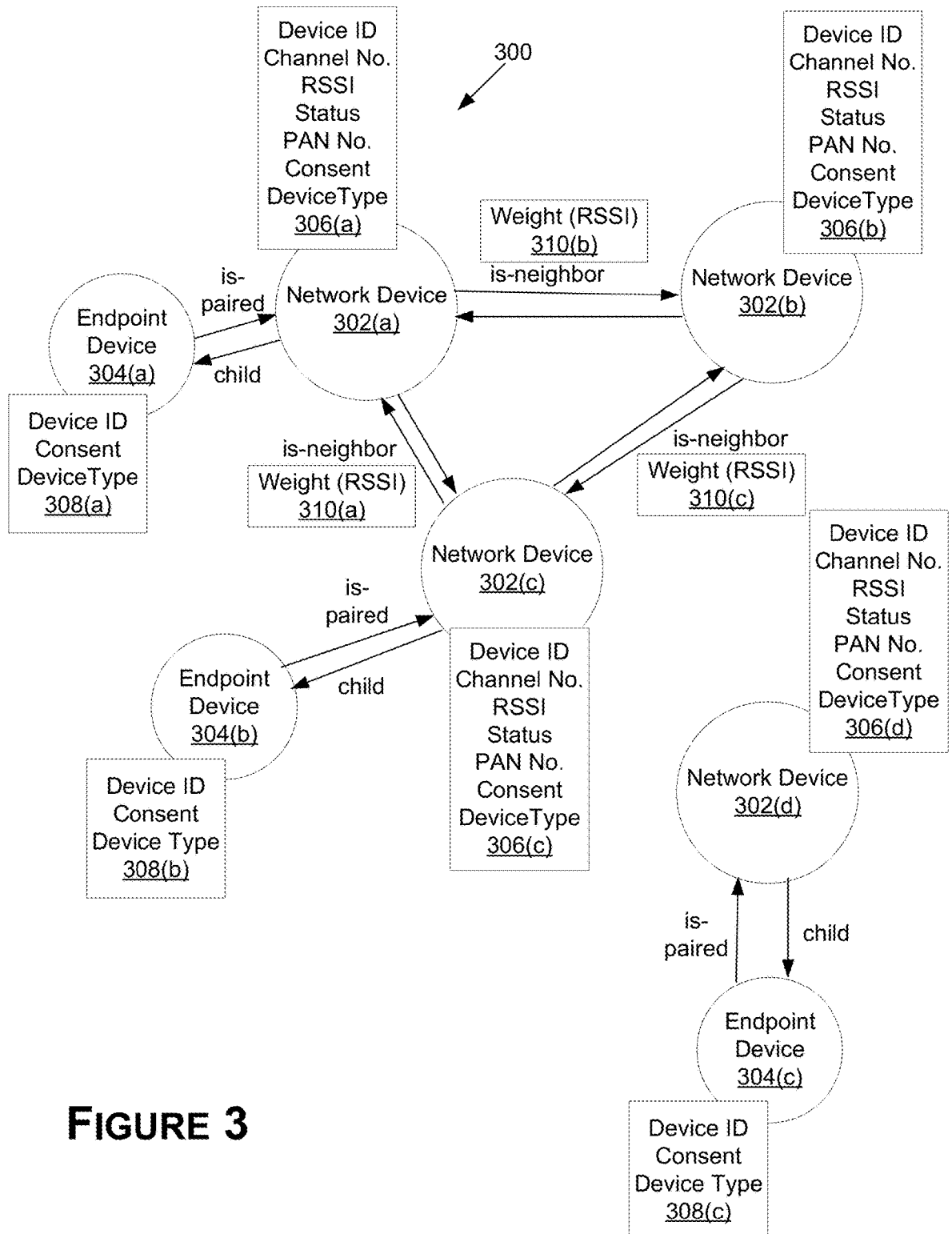
FIG. 3 is a diagram of an example network connectivity graph according to various aspects of the present disclosure.

FIG. 3 is a diagram of an example network connectivity graph 300 according to various aspects of the present disclosure. The network connectivity graph 300 depicts various network devices 302(a)-302(d), which may be representative of network devices such as the network devices 106 of FIG. 1. Along with each depiction of the network devices 302, the network connectivity graph 300 includes respective network device data 306(a)-306(d) for each of the network devices 302. The network device data includes a device identification number (device ID) of the network device 302, a channel number indicating the operating channel of the network device 302, an RSSI of the network device, a permanent account number (PAN) of a user account associated with the network device 302, a consent indicator (e.g., whether announcement messages are opted into or out of for a given network device 302), and a device type of the network device 302 (e.g., whether the device is a hub device, a bridge device, an A/V device, a VA device, etc.). This data may be gathered from messages received from network devices, such as the network devices 106 of FIG. 1, and from other sources. For example, the messages received from the network devices 106 may indicate an operating channel of the network device 106 transmitting the message and/or the operating channel of any network devices within which the network device 106 may be in communication (e.g., from which an announcement message has been received).

The status of the network device 302 may indicate whether the network device is capable of communicating with a network (e.g., whether the device is offline or online), or any other status indicator of a network device. The RSSI of the network device data 306 may indicate an RSSI of messages received at the network device 302 via the network 102.

As described herein, the network connectivity graph 300 may include information about which of the network devices 302 are determined to be within communication range with one another. That communication range information may be determined when a network device depicted as the network device 302(a), for example, receives announcement messages from the network devices depicted as the network devices 302(b) and 302(c), and the network device 302(a) sends one or more messages to the server(s) indicating that the announcement messages have been received. Based on those one or more messages, the network connectivity graph 300 may be built to indicate that the network device 302(a) is neighbors with both the network devices 302(b) and 302(c). Each of the neighbor relationships may also be associated with one or more neighbor parameters 310(a)-310(c). in the example of FIG. 3, the neighbor parameters 310 include an RSSI of the communication between two network devices 302, so that the network connectivity graph indicates the received signal strength of communications between two network devices 302.

Other sources of information that may be used to build the network connectivity graph 300 may include a list or table of endpoint devices 108 and what network devices 106 they are paired with, respectively. With this information, the endpoint devices 304(a)-304(c) and their respective endpoint device data 308(a)-308(c) may be incorporated into the network connectivity graph 300. Such a list or table may also include information about the endpoint devices 304 that may be included as the endpoint device data 308, such as a device identifier (device ID) of each endpoint device 304, a consent indicator (e.g., whether announcement messages are opted into or out of for a given network device 302), and a device type of the network device 302 (e.g., whether the device is a sensor device, a pet locator tag device, a home automation/lighting device, etc.).

In the example of FIG. 3, the network connectivity graph 300 indicates that each of the network devices 302(a)-302(c) are capable of direct or indirect communication with one another, while the network device 302(d) is not capable of direct or indirect communication with any of the other network devices 302(a)-302(c). Accordingly, communications to any of the network devices 302(a)-302(c) or their paired endpoint devices 304(a), 304(b) may be routed through any of the network devices 302(a)-302(c), while communications to the network device 302(d) and its paired endpoint device 304(c) may only be routed to or via the network device 302(d). In various embodiments, network connectivity graphs or tables may have additional, fewer, or different data than that shown in FIG. 3.

Figure 4:
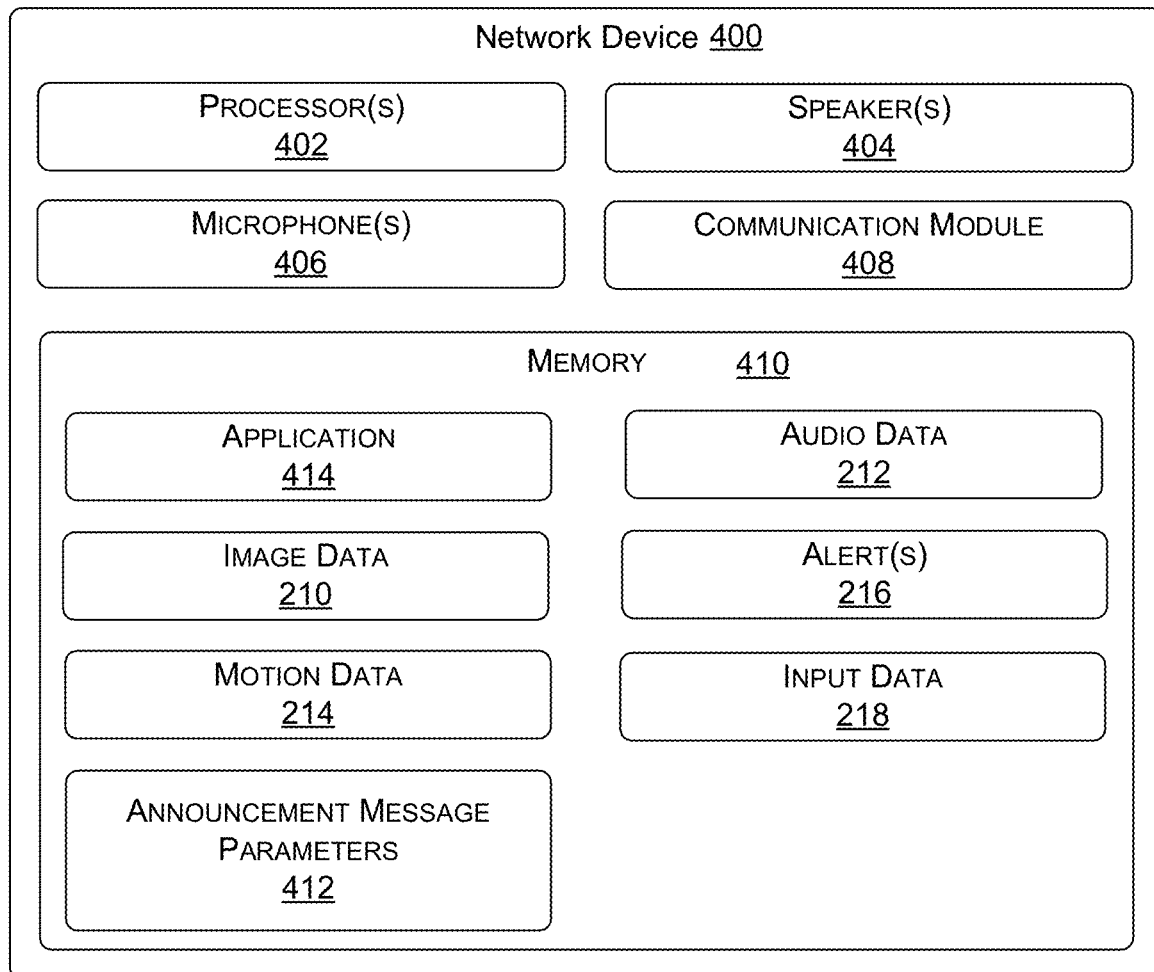
FIG. 4 is a functional block diagram illustrating one example embodiment of a network device according to various aspects of the present disclosure.

FIG. 4 is a functional block diagram illustrating an embodiment of a network device 400 according to various aspects of the present disclosure. The network device 400 is an example of the network devices 106 (FIG. 1), and may be, for example, a Wi-Fi hub, a hub of a home automation system ("smart-home" hub), a hub of a home security/alarm system, a floodlight camera, a video doorbell, a bridge device, and/or any other type of device having similar components and/or functions. In some examples, the network device 400 may include the functionality of a VA device (e.g., the network device 106(a)). The network device 400 may comprise processor(s) 402 (which may be similar to, and/or include similar functionality as, the processor(s) 202) that are operatively connected to speaker(s) 404, microphone(s) 406, a communication module 408 (which may be similar to, and/or include similar functionality as, the communication module 204), and memory 410 (which may be similar to, and/or include similar functionality as, the memory 224). In some embodiments, the network device 400 may further comprise one or more cameras (not shown). In some embodiments, the network device 400 may not include one or more of the components shown in FIG. 4, such as the speaker(s) 404 and/or the microphone(s) 406.

As shown in the example of FIG. 4, the memory 410 stores an application 414 comprising instructions that the processor(s) 402 execute(s) to receive sensor data from sensors (e.g., the endpoint devices 108(c), 108(d)) and/or the automation devices (e.g., the endpoint devices 108(a), 108(b), 108(e)). For example, the sensor data may include a current state (e.g., opened/closed for door and window sensors, motion detected for motion sensors, living room lights on/off for a lighting automation system, etc.) of each of the sensors and/or the automation devices. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors and/or the automation devices as well as any updates to the current state based on sensor triggers.

With further reference to FIG. 4, the application 414 may configure the processor(s) 402 to receive the audio data 212, the image data 210, the motion data 214, the input data 218, and/or the alert(s) 216 from a network device 106 (in some embodiments, via the server 200) using the communication module 408. For example, the network device 400 may receive and/or retrieve (e.g., after receiving a signal from the network device 106(d) that the network device 106(d) has been activated) the image data 210, the input data 218, and/or the motion data 214 from the network device 106(d) and/or the server 200 in response to motion being detected by the network device 106(d). The application 414 may then configure the processor(s) 402 to transmit, using the communication module 408, the audio data 212, the image data 210, the motion data 214, the input data 218, and/or the alert(s) 216 to the server 200, and/or an additional electronic device (e.g., any of the other network devices 106 or the endpoint devices 108).

As described herein, at least some of the processes described herein may be executed by the network device 400. For example, the network device 400 may transmit announcement messages, receive announcement messages from other network devices, extract information from an announcement message, and transmit messages to one or more servers after receiving an announcement message as described herein. In addition, the network device 400 may also receive from one or more servers announcement message parameters 412, which may be stored in the memory 410. The announcement message parameters 412 may include one or more of instructions that announcement messages should be sent out, instructions whether announcement messages should be received and/or whether messages should be sent to the one or more servers based on receipt of an announcement message (e.g., whether announcement messages are opted into or out of for a given network device), instructions on how often to send out announcement messages (e.g., once a day, once a week, once every other day, once every twelve (12) hours, once every six (6) hours), instructions on when to send out announcement messages (e.g., if announcement messages are sent out once a day then a particular time of day, instructions to generate a random time within in a certain time period to send out the announcement messages, instructions to send out announcement messages at an offset amount of time from a base time such as midnight or noon), instructions regarding which channels to send out announcements over, a format for the announcement messages, etc. In this way, a network device may have stored thereon computer readable instructions for sending out announcement frames. Similarly, the announcement message parameters 412 may include instructions for what to do after an announcement message is received. For example, such instructions may include one or more of where to send a message with extracted contents of the announcement message received, instructions for extracting data from an announcement message, instructions for measuring or otherwise determining additional information for inclusion in a message to the one or more servers (e.g., instructions for messaging SNR and/or RSSI, instructions for what information about the network device 400 and/or its associated endpoint devices to send), a format for the message sent to the one or more servers, etc.

Various embodiments described herein relate to the transmission of announcement messages by network devices to determine which network devices are able to communicate with one another. In particular, various embodiments described herein relate to a first network device transmitting multiple announcement messages in quick succession over multiple wireless channels that represent operating channels of other network devices with which the first network device may communicate. The first network device may have its own operating channel (e.g., one of a predetermined number of channels of a particular wireless protocol). Thus, while the first network device may have its own operating channel, the first network device may cycle through all of the predetermined number of channels of a particular wireless protocol to transmit the announcement messages over each of the channels. Each announcement message may include information representative of a unique identifier associated with the first network device and information representative of the operating channel of the first network device.

The operating channel of a network device may be picked randomly, may be assigned by a server, may be pre-programmed on a network device, or may be chosen by the network device or a nearby other network device. For example, where the operating channel is chosen by a network device, it may select an operating channel that other nearby network devices are not using. Such a selection may occur by scanning through the channels upon startup to determine a channel that has less traffic compared to other channels, or no traffic. In another example, the network device may communicate with other network devices nearby through a network or directly to request a channel that the nearby network device(s) are operating in, so that a channel not being used may be selected by the network device.

The operating channel of a given network device is used as the channel for communication with endpoint devices (e.g., the endpoint devices 108 of FIG. 1). The network devices typically communicate with the endpoint devices to receive alerts from the endpoint devices, control the endpoint devices, or otherwise communicate with the endpoint devices. Thus, it is desirable for a network device to stay in its operating channel as much as possible so that its associated endpoint devices are not essentially inoperable while the network device is not in its respective operating channel. For example, a 900 MHz communication band may have 8 channels, so a network device may be assigned, or may choose, any of the 8 available channels for communication with its paired endpoint devices. The operating channel also may be different than a channel over which a network device (e.g., one of the network devices 106 of FIG. 1) communicates over a network (e.g., the network 102). For example, if the network 102 is a Wi-Fi network, a network device may communicate with the Wi-Fi network over a Wi-Fi channel assigned by a Wi-Fi router using the network device's Wi-Fi communication hardware, while communicating over a channel of a different wireless protocol (e.g., the 900 MHz communication band) with any endpoint devices using separate wireless communication hardware. Accordingly, an operating channel as used herein is a channel in which a network device communicates with its paired endpoint devices.

Network devices receive one of the announcement messages over their respective operating channels, and then send a message to one or more servers indicating that one of the announcement messages was received. The messages to the one or more servers may therefore be over a communication protocol and channel (e.g., Wi-Fi) that is not the network device's operating channel. Because the other network devices send a message to one or more servers instead of back to the first network device, the first network device need not wait for any responses to the announcement messages from the other network devices. As a result, traffic over the channels of a given wireless protocol may be reduced as compared to scanning methods that use a request from a first device and responses from each device that receives the request. In addition, using the embodiments described herein may result in less time spent outside of an operating channel of a given network device. For example, in various embodiments, the first network device may cycle through channels over which announcement messages are transmitted without pausing to wait for other network device responses. This may result in less time spent out of an operating channel of the first network device. In addition, the various embodiments described herein do not require the other network devices to switch out of their respective operating channels to receive the announcement messages from the first network device, or to send their own messages to the server(s) after receiving the announcement messages from the first network device.

The network devices that receive an announcement message may extract information from the announcement message, including a device identifier of the first network device and the operating channel of the first network device. This extracted information may be sent to the server(s). In this way, based on the messages transmitted to the server(s) from the other network devices that receive an announcement message, the server(s) may determine which network devices are able to wirelessly communicate directly with one another. In addition to information extracted from the announcement message itself, the network devices may include other information in the messages sent to the server(s). For example, the network device receiving the announcement message may measure parameters of the received announcement message, such as signal power (e.g., a received signal strength indicator (RSSI)) and/or a signal to noise ratio (SNR). Other parameters of the announcement message that may be determined and included in a message to the server(s) may include, for example, a modulation type of the announcement message and/or an identification of the channel over which the announcement message is received (e.g., the operating channel of the network device that received the announcement message). A network device that receives one of the announcement messages may further include additional information in the message sent to the server(s), such as a time at which the announcement message was received (e.g., a timestamp) and/or a unique identifier of the network device that received the announcement message.

In this way, a message sent to the server(s) may include information including both the unique identifiers of the sending and receiving network devices, indicating two network devices that are capable of direct wireless communication with one another, as well as their respective operating channels and characteristics of such communication (e.g., RSSI, SNR, modulation type). With this information received from a plurality of network devices, the server(s) may generate, update, or otherwise incorporate this information about which network devices are able to wirelessly communicate with one another into a network connectivity graph or table. The network connectivity graph or table may be used, for example, to route communications to any of the network devices, including, for example, in cases where connectivity between certain network devices and/or between a network device and the server(s) may be temporarily unavailable. In another example, parameters such as RSSI and SNR may be used for routing communications along routes with better connectivity (e.g., higher RSSI and SNR values) than alternate routes. In another example, the network connectivity graph or table that includes information to determine all different possible routings for various communications may be used for load balancing, such that communications between numerous network devices may be balanced across those network devices to avoid congestion amongst a relative few number of the numerous network devices.

Each of the processes described herein, including the processes 500 and 700, are illustrated as a collection of blocks and signals in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks and/or signals may be combined in any order and/or in parallel to implement the processes. Additionally, any number of the described blocks and/or signals may be optional and eliminated to implement the processes.

Figure 5:
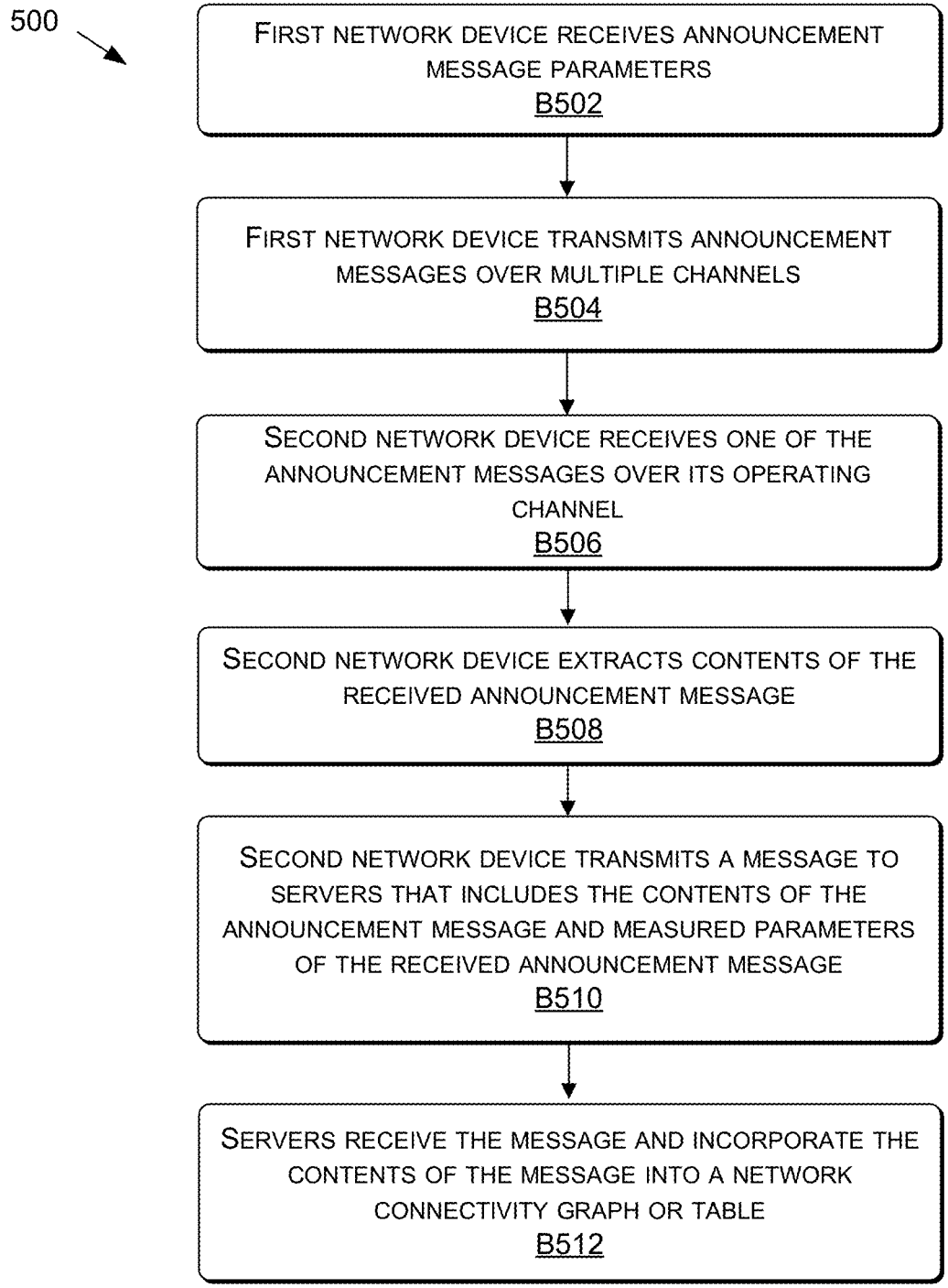
FIG. 5 is a flowchart illustrating an example process for transmitting announcement messages between network devices and building a network connectivity graph or table, according to various aspects of the present disclosure.

FIG. 5 is a flowchart illustrating an example process 500 for transmitting announcement messages between network devices and building a network connectivity graph or table, according to various aspects of the present disclosure. In the process 500, at block B502, a first network device receives announcement message parameters. For example, the network device 400 may receive, from the server 200, announcement message parameters regarding format of and/or timing for sending announcement messages. The parameters may further indicate what channels announcement messages should be transmitted over. In various embodiments, the announcement message parameters may be pre-installed on a network device, such that the network device need not receive the announcement message parameters from a server. In various embodiments, the instructions to send out announcement messages and/or messages sent as a result of a received announcement message may also be toggled on and off. Thus, instructions to toggle on or off the sending of announcement messages and/or sending of messages as a result of a received announcement message may be received from the server 200 or any other device, regardless of whether the announcement message parameters were received from the server 200 or were preinstalled on the network device. In various embodiments, the announcement message parameters may also be updated via a transmission from the server 200.

The announcement message parameters may include instructions for periodically transmitting announcement messages. For example, the announcement message parameters may include a time interval parameter indicative of how often the announcement messages should be sent. For example, the announcement message parameters may indicate that the announcement messages should be sent out once per day. In some examples, the announcement message parameters may further include additional instructions for when to send announcement messages. For example, where the announcement messages are sent once a day, the announcement message parameters may include instructions for the first network device to generate a random time of day for each day to transmit the announcement messages, or to generate a random time of day on which the announcement messages are transmitted at the same time of day on an ongoing basis. The announcement message parameters may also instruct a particular time of day at which announcement messages should be transmitted, or may instruct the first network device to offset the transmission of announcement messages by a predetermined amount of time from a set time of day (e.g., transmit announcement messages two hours after midnight each day).

The announcement message parameters may also include a channel-identification parameter indicative of which channels the first announcement message and the second announcement message should be transmitted over. For example, the channel-identification parameter may include a number of channels, a wireless protocol associated with the channels, and/or modulation information about the channels or wireless protocols of the channels, such that a network device has the necessary information to transmit the announcement messages.

Examples of wireless protocols that may be used may include a 900 MHz band of radio spectrum that uses 8 channels; a 2.4 GHz Wi-Fi protocol that uses 11, 13, or 14 channels; a 3.5 GHz band of radio spectrum that uses 8 or 15 channels; a 5 GHz Wi-Fi protocol that uses 23 channels; a 6 GHz industrial, scientific, and medical (ISM) band of radio spectrum channel for Wi-Fi that uses 3, 4, 6, 7, 9, 12, 14, 20, 24, 29, 41, or 59 channels (e.g., Wi-Fi 6E); a 60 GHz ISM band of radio spectrum channel that uses 6 channels (e.g., WiGig); or any other type of protocol or number of channels.

The announcement message parameters may further include parameters related to the announcement messages themselves, such as a format for the announcement messages, information to include in the announcement messages (e.g., a unique identifier and/or operating channel of the network device sending the announcement messages). Similarly, the announcement message parameters may also include similar parameters (e.g., format for and/or contents of) for messages that are sent to one or more servers after a network device has received an announcement message.

Figure 6A:
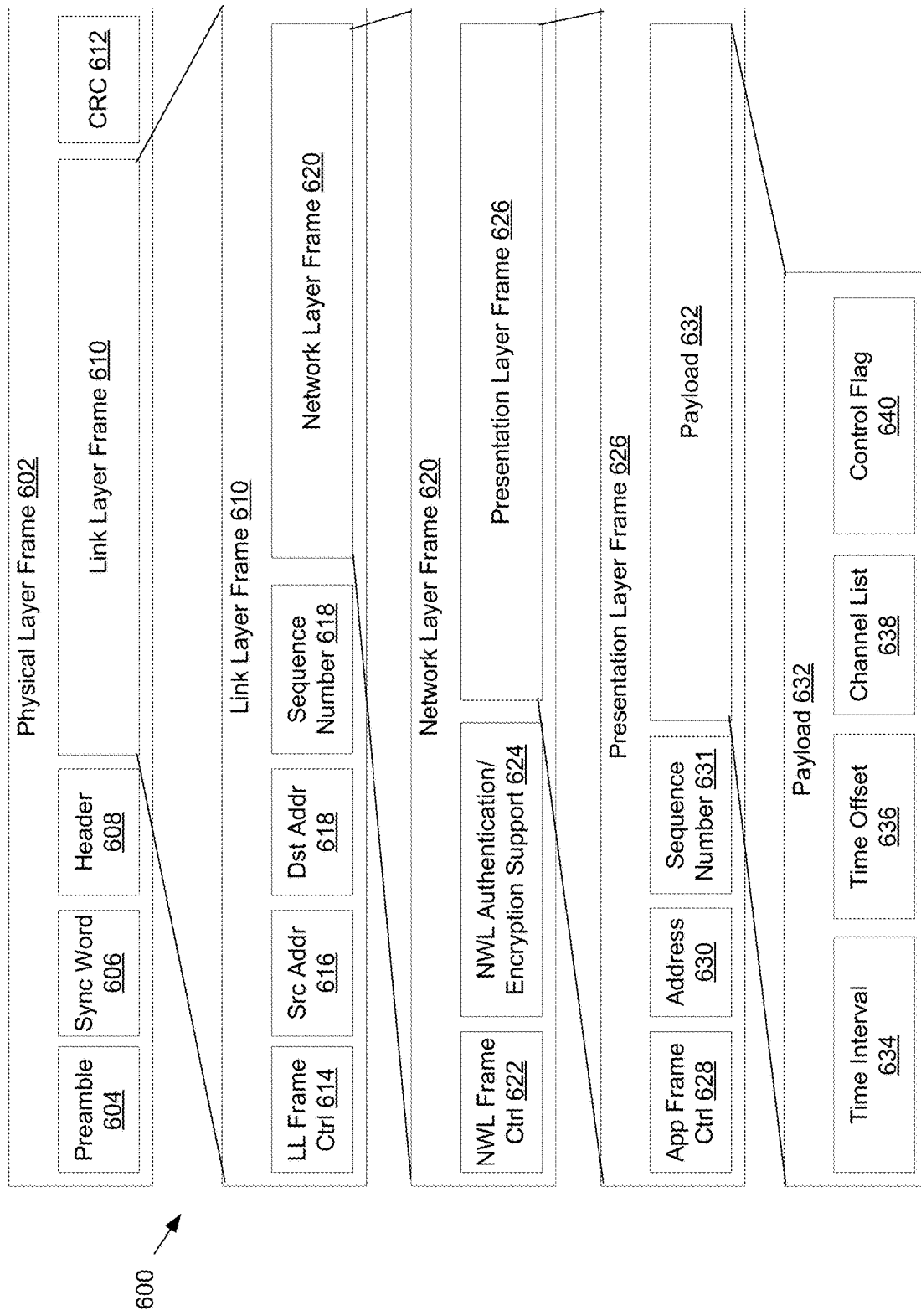
FIG. 6A is a block diagram of example announcement message parameters transmitted from a server to a network device according to various aspects of the present disclosure.

As just one non-limiting example of a communication that includes announcement message parameters received from one or more servers, FIG. 6A shows a diagram of an example announcement message parameter communication transmitted from a server to a network device. The communication includes a physical layer frame 602 that includes a preamble 604, a sync word 606, a header 608, a link layer frame 610, and a cyclic redundancy check (CRC) 612. The preamble 604 may include a pattern of bits that allow devices to synchronize their receiver clocks and provide for better communication with one another, and the sync word 606 may indicate the end of the preamble 604 and the beginning of data in the message. The header 608 may indicate a type of message being sent (e.g., an Ethernet message). The CRC 612 may be used for error detection.

The link layer frame 610 may include payload data to be transmitted (e.g., the announcement message parameters themselves), as well as link layer frame control data 614, a source address 616, a destination address 618, a sequence number 618, and a network layer frame 620. The source address 616 and the destination address 618 include destination and source addresses for a message, such as media access control (MAC) addresses of each of the destination and source device. For example, in an announcement message parameter communication the source may be the server(s) 104 and a destination may be one of the network devices 106.

The network layer frame 620 may include payload data to be transmitted (e.g., the announcement message parameters themselves), as well as network layer frame control data 622, network layer authentication/encryption support data 624, and a presentation layer frame 626. The network layer authentication/encryption support 624 may include encryption information for the communication. This may be advantageous where, for example, communications are routed through the network 102 of FIG. 1 and/or network devices 106 that are associated with different user accounts (e.g., PANs).

The presentation layer frame 626 includes payload 632 data to be transmitted (e.g., the announcement message parameters themselves), as well as an application frame control 628, an address 630, and a sequence number 631. The application frame control 628, the address 630, and the sequence number 631 are used to control which software application the payload 632 is routed to at a destination device (e.g., one of the network devices 106).

The payload 632 includes the announcement message parameters as described herein. For example, a time interval parameter 634 may include four bytes of information to indicate a time interval (e.g., how often in seconds) for sending the announcement messages, a time offset parameter 636 may include four bytes of information to indicate an offset from a particular time of day at which the announcement frames should be sent (e.g., a backoff time in seconds), a channel list parameter 638 may include two bytes of information indicating the channels over which the announcement messages should be sent, and a control flag parameter 640 may include one byte of information indicating whether a network device should enable or disable discovery based on receipt of announcement messages (whether the network device should listen for announcement messages, whether the network device should transmit announcement messages, and/or whether the network device should transmit a message to one or more servers upon receipt of an announcement message). In various embodiments, additional, fewer, or different announcement message parameters may be included in an announcement message communication. For example, an announcement message parameter communication may include instructions from the server whether to perform a scan in different modes, such as a low data rate mode or a high data rate mode. Such a parameter may therefore indicate to a network device how quickly to send out announcement messages. Such a parameter may include one byte of information.

In the process 500, at block B504, the first network device transmits the announcement messages. The first network device may transmit the announcement messages on each channel according to the announcement message parameters. Further, the first network device may transmit the announcement messages on each channel in quick succession, because the first network device does not wait for or receive responses to the announcement messages from any other network device. The first network device may transmit the announcement messages using a wireless transmitter of the first network device, such as the communication module 408 of FIG. 4. Since the first network device does not wait for any response to an announcement message sent over a particular channel, the first network device can reconfigure transmit radio hardware (e.g., an antenna) to a next channel for transmission of a next announcement message as soon as a processor (e.g., the processor(s) 402 of FIG. 4) receives an acknowledgement from the wireless transmitter that the announcement message over the first channel has been successfully transmitted. Advantageously, waiting for a first announcement message to be confirmed as sent before reconfiguring transmit radio hardware for a second announcement message and queuing a second announcement message allows the network device to send or receive other messages between transmitting announcement messages, if needed. For example, a network device may receive a request from a server or client device to check the status of an endpoint device. The network device may communicate with an endpoint device as desired before reconfiguring the transmit radio hardware and queuing subsequent announcement messages. This further reduces any downtime for the network device. Accordingly, the transmit radio hardware may include two different sets of transmit radio hardware. For example, a network device may include transmit radio hardware configured for the wireless protocol with which the network device communicates with endpoint devices (e.g., over a 900 MHz band of channels), and a second transmit radio hardware set configured for communication with a network (e.g., a Wi-Fi radio where the network 102 is Wi-Fi).

Figure 6B:
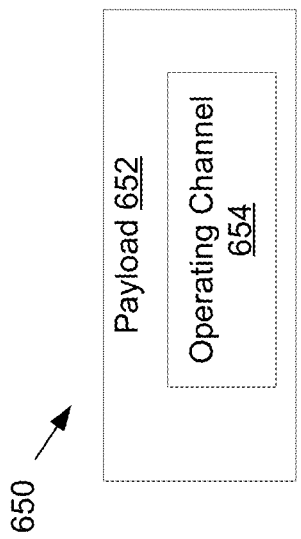
FIG. 6B is a block diagram of the payload of an example announcement message transmitted from a network device to other network devices according to various aspects of the present disclosure.

In various embodiments, the announcement message may be in different formats, be different sizes, contain different information, etc. based on the announcement message parameters. For example, an announcement message may be a data packet, a data frame, etc. The format, size, information contained therein, etc. of an announcement message may also vary based on a type of wireless protocol used by the network devices for transmitting announcement messages. As just one non-limiting example, FIG. 6B is a diagram of the payload 652 of an example announcement message 650 transmitted from a network device to other network devices. The payload 652 may be in a message similar to the message 600 of FIG. 6A, but with the payload 652 substituted for the payload 632. In other embodiments, the payload 652 may be the payload of a differently formatted message than that shown in FIG. 6A. In various embodiments, a payload of a message (e.g., the payload 632, the payload 652) may also include a command class parameter and/or a command identifier. For example, the command class information may indicate that the message is a certain class or type of message (e.g., messages related to functionality for building a network connectivity graph or table as described herein). The command identifier may indicate what type of message within that command class a given message is. For example, the command identifier may indicate whether the message is related to announcement parameters for sending out announcement messages, is an announcement message, or is a message sent back to a server(s) in response to an announcement message.

The announcement message 650 may include one byte of information indicating the operating channel 654 of the network device sending the announcement message in the payload 652. This information is, in various embodiments, the only information sent in the payload 652 as it is the only information to be extracted by the receiving network device that may not be extracted from other parts of an announcement message. For example, the announcement message 650 may also include (e.g., in the payload 652, in a header of the message 650) one byte of information indicating modulation information (e.g., spreading factor indicating how many chirps of data are sent per second) of the network device sending the announcement message, to be extracted by a network device that receives the announcement message 650. The header of the announcement message may be similar to a portion of the message 600 that is not the payload 632, and may include a unique identifier of the network device sending the announcement message, and information so that the network device receiving the announcement message can calculate an RSSI and SNR for the received announcement message. In various embodiments, an announcement message may also include an asset type (e.g., hub device, A/V device, VA device, etc.) of the first network device, asset types of endpoint devices paired with the first network device, unique identifiers of endpoint devices paired with the first network device, operating channels of endpoint devices paired with the first network device, modulation information for communicating with endpoint devices paired with the first network device, etc.

In the process 500, at block B506, a second network device receives one of the announcement messages transmitted by the first network device. The announcement message may be received, for example, by a wireless receiver of a second network device (e.g., the communication module 408 of FIG. 4). As described herein, the announcement message may be received over an operating channel of the second network device. The operating channel of the second network device may be, for example, the channel over which the second network device primarily communicates, for example with one or more servers (e.g., the server(s) 104 of FIG. 1) over a network (e.g., the network 102 of FIG. 1) or with endpoint devices paired with the second network device. As described herein, receiving the announcement message over the second network device's operating channel advantageously means the second network device does not need downtime from communicating with servers, a network, or its endpoint devices to receive the announcement message.

In the process 500, at block B508, the second network device extracts contents of the received announcement message. For example, the second network device may extract one or more of an operating channel of the first network device, the channel over which the announcement message was transmitted, a unique identifier of the first network device, and/or modulation information, from the contents of the announcement message. In addition, the second network device may also calculate quality metrics (e.g., may measure parameters of the received announcement message) such as an RSSI and/or SNR value, or any other type of quality metric for a received signal. In various embodiments, modulation information of the announcement message and/or standard communications of the first network device over its operating channel may be indicated in the payload of the announcement message itself, or may be determined based on the modulation aspects of the received announcement message itself. The unique identifier may be, for example, extracted from a medium access control (MAC) header of the announcement message, while the operating channel may be determined from the message payload itself. The operating channel of the second network device over which the announcement message was received may be presumed based on the receipt of the announcement message itself by the second network device, or may be separately indicated as part of the payload of the announcement message.

In the process 500, at block B510, the second network device transmits a message to one or more servers that includes contents of the announcement message as well as the measured parameters of the announcement message. For example, the message may include the unique identifier of the first network device, a time at which the announcement message was received by the second network device, a unique identifier of the second network device, the operating channel of the first network device, the operating channel of the second network device (or the channel over which the announcement message was received), a received signal strength indicator (RSSI) value associated with the announcement message, a signal to noise ratio (SNR) value associated with the announcement message, and/or modulation information of the announcement message. The modulation information may include different frequency-shift keying (FSK) information (e.g., information regarding a frequency modulation scheme used for communication over the operating channel), spreading factor information (e.g., LoRa spreading factor indicating how many chirps of data are sent per second), modulation information relating to a particular wireless protocol being used (e.g., Wi-Fi, X10, RS-485, 6LoWPAN, Bluetooth LE (BLE), ZigBee, Z-Wave, IEEE 802.15.4, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet), and/or any other type of modulation information. Other types of information may also be sent to the one or more servers from the network device that has received an announcement message. For example, current loading/traffic through the second network device may be determined and transmitted along with the message (and/or current loading/traffic through the first network device and included in the payload of the announcement message), a noise floor as measured at the second network device (and/or as measured at the first network device and included in the payload of the announcement message), etc. In the present embodiments, the second network device does not send a response to an announcement message back to the first network device.

Figure 6C:
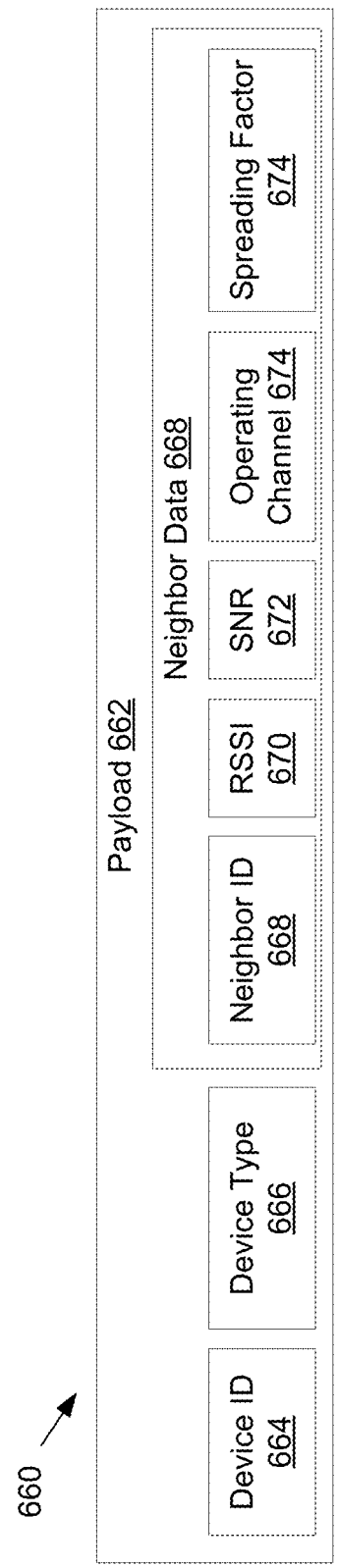
FIG. 6C is a block diagram of an example message transmitted from a network device to a server after an announcement message has been received, according to various aspects of the present disclosure.

FIG. 6C is a diagram of an example message 660 transmitted from a network device to a server after an announcement message has been received. The message 660 includes a payload 662, which may be a payload of a message similar to the message 600 of FIG. 6A, or may be the payload of a differently formatted message. The payload 662 may be formatted and sent, for example, as a j son file. Various information in the payload 662 may be extracted from an announcement message (e.g., the announcement message 650) as described herein. The message 660 may include information such as a device ID 664 of the network device transmitting the message and a device type 666 of the network device transmitting the message. The message 660 may further include neighbor data 668 about a network device from which an announcement message (e.g., the announcement message 650) was received. For example, the neighbor data 668 may include (1) a neighbor ID 668 extracted from the announcement message by the receiving network device; (2) an RSSI 670 and SNR 672 calculated by the network device sending the message and associated with signal strength and signal to noise ratio of the communications between the network device that sent the announcement frame and received the announcement frame; (3) an operating channel 674 of the network device that transmitted the announcement message as indicated, for example, in the payload 652 of the message 650; and (4) a spreading factor 674 of the network device that transmitted the announcement message as extracted by the network device that received the announcement message. As described herein, the message 660 and its payload data 662 may be used to build a network connectivity graph or table (e.g., the network connectivity graph 300 of FIG. 3).

In various embodiments, a message to the one or more servers may also include an asset type of the first network device, asset types of endpoint devices paired with the first network device, unique identifiers of endpoint devices paired with the first network device, operating channels of endpoint devices paired with the first network device, modulation information for communicating with endpoint devices paired with the first network device, an asset type of the second network device, asset types of endpoint devices paired with the second network device, unique identifiers of endpoint devices paired with the second network device, operating channels of endpoint devices paired with the second network device, modulation information for communicating with endpoint devices paired with the second network device, etc. Where information about endpoint devices is transmitted to the one or more servers, the one or more servers may include information about the endpoint devices in the network connectivity graph or table.

In the process 500, at block B512, the one or more servers receives the message and incorporates the contents of the message into a network connectivity graph or table. As described herein, various data from the message and other sources may be incorporated into the network connectivity graph or table.

Figure 7:
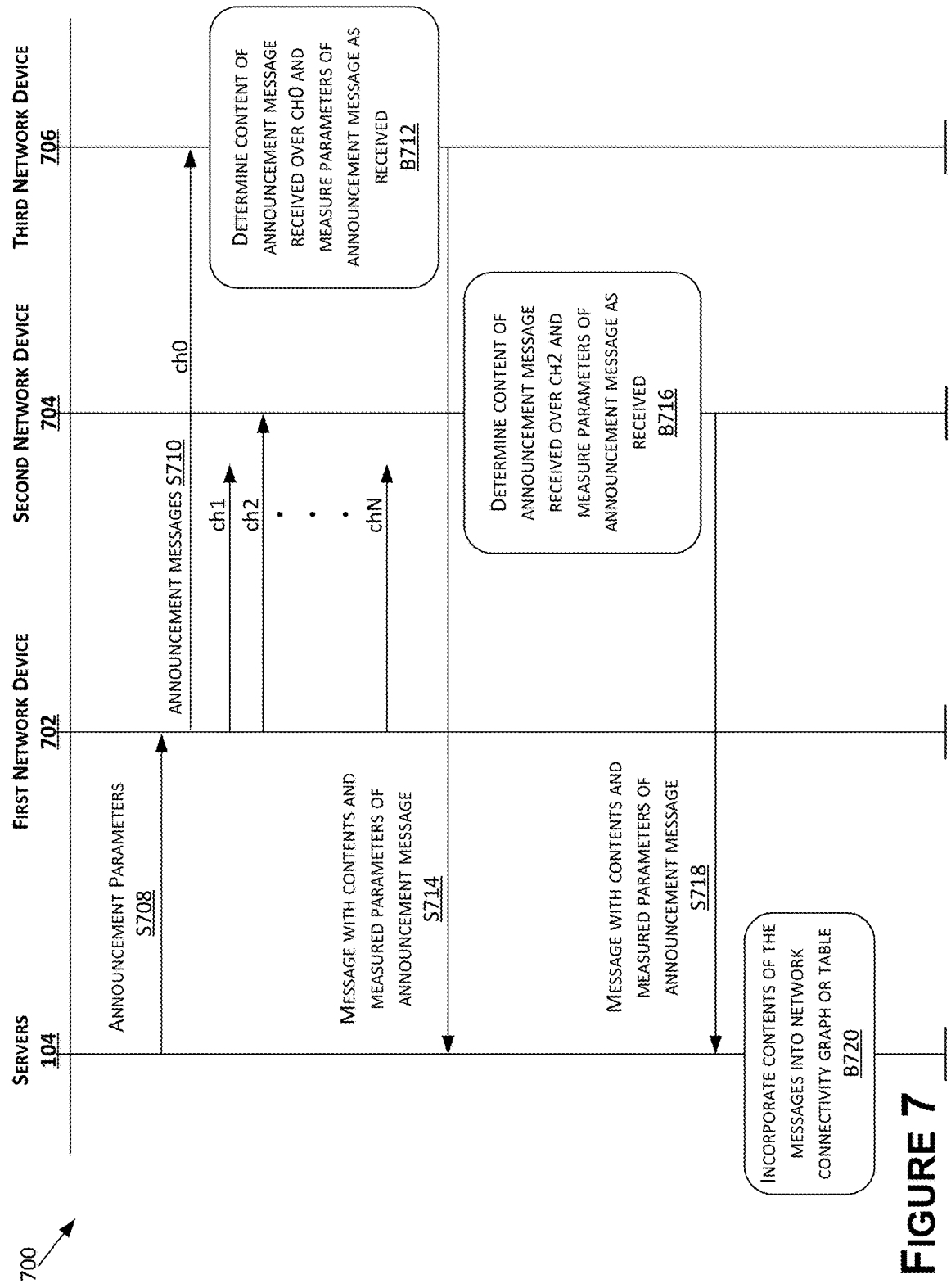
FIG. 7 is a sequence diagram of a process for transmitting announcement messages between network devices and building a network connectivity graph or table, according to various aspects of the present disclosure.

FIG. 7 is a sequence diagram of a process for transmitting announcement messages between network devices and building a network connectivity graph or table, according to various aspects of the present disclosure. First, second, and third network devices 702, 704, and 706 may include any of the network devices 106 (FIG. 1).

In the process 700, at step S708, the server(s) 104 (referred to hereinafter for discussion of FIG. 7 as the server 200) transmits announcement parameters to the first network device 702 (e.g., similar to block B502 of FIG. 5). In various embodiments, the server 200 may also transmit announcement parameters to the second and/or third network devices 704, 706, so that they may also send and/or receive announcement messages, as well as transmit messages to the server 200 upon receipt of an announcement message.

In the process 700, at step S710, the first network device 702 transmits announcement messages over wireless channels 0, 1, 2 . . . N, which may be received by various network devices that are in wireless communication range with the first network device 702 (e.g., similar to block B504 of FIG. 5). The second and/or third network devices 704, 706 may also transmit announcement messages similar to those of step S710 at different times than the first network device 702. The announcement message parameters discussed herein may be such that the first, second, and third network devices 702, 704, and 706 send announcement messages at different times of day, so that a network device is not switching channels to transmit announcement channels at the same time as other nearby network devices. This advantageously makes it more likely that a network device will not miss announcement messages from a nearby network device.

The channel zero (ch0) announcement message in FIG. 7 is received by the third network device 706, and the channel two (ch2) announcement message in FIG. 7 is received by the second network device 704. After receiving the announcement messages, the second and third network devices 704 and 706 each extract contents (e.g., an operating channel of the first network device 702, the channel over which the announcement message was transmitted, a unique identifier of the first network device 702, and/or modulation information) of the announcement messages received over channel zero (ch0) and channel two (ch2), respectively, and measure the parameters (e.g., RSSI and/or SNR) of the announcement messages at blocks B712 and B716, respectively. The second and third network devices 704 and 706 then transmit messages S714 and S718 with the contents and measured parameters of the announcement messages to the server 200 (e.g., similar to blocks B508 and B510 of FIG. 5).

In the process 700, at block B720, the server 200 incorporates the contents of the messages sent in steps S714 and S718 into a network connectivity graph as described herein (e.g., similar to block B512 of FIG. 5). In various embodiments, the server 200 may transmit information to a network device indicating what other network devices are within communication range. For example, the server 200 may transmit to the first network device 702 information about the second and third network devices 704 and 706, including information such as information indicating that the second and third network devices 704 and 706 are within communication range; unique identifiers thereof; modulation information thereof; operating channels thereof; SNR and/or RSSI information; endpoint device identifiers, operating channels, asset types, etc. of endpoint devices paired with the second and third network devices 704 and 706; or any other type of information for communicating with the second and third network devices 704 and 706. Such information could be pushed to the network devices periodically, or each time a server gets new information from the network devices via an announcement message. In various embodiments, a network device may also poll the servers for such information.

FIGS. 8A-8C are diagrams illustrating and comparing and contrasting example methods 802, 806, 808 for transmitting announcement messages. In particular, FIG. 8C demonstrates how a network device 804 (e.g., similar to any of the network device(s) 106 of FIG. 1) may transmit announcement messages according to the processes (e.g., FIGS. 5 and 7) described herein, and how those processes result in a smaller time interval used to communicate with other network devices as compared to other types of processes, such as the methods 802 and 806 shown in FIGS. 8A and 8B, respectively.

FIG. 8A illustrates the method 802, which comprises passive scanning for beacons from devices within range of the network device 804. This technique is used in Wi-Fi networks, and is described in the IEEE 802.11 standard. In particular, an interval 810 is a dwell time in which the network device 804 waits in channel 0 to receive a beacon from any nearby device (e.g., beacons 816, 818). The interval 810 lasts for at least a beacon interval (100 milliseconds in the IEEE 802.11 standard) plus any additional time $\Delta$ while the network device 804 receives beacons from any nearby devices. The more beacons the network device 804 receives, the longer the length of the $\Delta$. After the interval 810, the network device 804 switches to channel 1 for another interval 812 to again receive any beacons from nearby devices (e.g., beacon 820). This process of switching channels and waiting for beacons repeats as the network device 804 cycles through all channels N. This process is inefficient, because the network device 804 must dwell in each channel for an unknown amount of time (beacon interval+$\Delta$).

FIG. 8B illustrates the method 806, which comprises active scanning with probing. In particular, the network device 804 transmits a request 826 on channel 0 at the beginning of an interval 822, and then waits on channel 0 for responses to the request 826 (e.g., responses 828, 830) from other nearby devices. The interval 822 lasts for at least a probe interval (40 milliseconds in the IEEE 802.11 standard) plus any additional time $\Delta$ while the network device 804 receives responses from any nearby devices. The more responses the network device 804 receives, the longer the length of the $\Delta$. After the interval 822, the network device 804 switches to channel 1 for another interval 824 in which the network device 804 sends a request 832 and again waits on channel 1 to receive any responses from nearby devices (e.g., response 834). This process of switching channels, transmitting requests, and waiting for responses repeats as the network device 804 cycles through all channels N. This process is inefficient, because the network device 804 must dwell in each channel for an unknown amount of time (beacon interval+$\Delta$).

FIG. 8C illustrates the method 808 according to the present embodiments. In the method 808, the network device 804 transmits announcement messages 840(1) . . .

840(N) on successive channels N during an announcement messages interval 838, without any dwell time on any of the channels N to wait for beacons or responses, as in the methods 802 and 806. Instead, the network device 804 cycles through to a next channel as soon as transmission over the previous channel is complete. In other words, an amount of time between a completion of sending the first announcement message on channel 0 and a beginning of sending the second announcement message on channel 1 is substantially equal to a channel switching time of the wireless transmitter in switching from channel 0 to channel 1. For example, the transmit time for a single announcement message may be 60 milliseconds (ms) or less, 70 ms or less, 80 ms or less, 90 ms or less, 100 ms or less, or anywhere between 60 and 100 ms. A time to switch the transmitter to a different channel may be 60 microseconds (μs) or less, 70 us or less, 80 us or less, 90 us or less, 100 us or less, or anywhere between 60 and 100) μs. Switching from one channel to another within a frequency band includes, for example, reconfiguring the transmit radio hardware of a network device to receive and/or transmit communications over a different channel within the frequency band. In frequency bands of various wireless protocols, each channel may have its own unique center frequency and/or bandwidth within the frequency band, so radio transmit hardware may be switched between configurations for different specific frequencies when the radio transmit hardware is switched between channels.

In various embodiments, the total time for transmitting a series of announcement messages may be approximately the transmit time for each announcement message plus the switching time to switch between the channels for each subsequent announcement message. In some embodiments, there may be additional time for a network device to transmit a series of announcement messages than just the transmit time of the announcement messages plus the time for switching between the channels over which the announcement messages are sent. In any instance, the total time for transmitting out a series of announcement messages may also be dependent on any of the number of channels (and total number of announcement messages sent), the wireless protocol being used, the size of the preambles of messages of different types of wireless protocols (e.g., a physical layer preamble), the size of a payload of the messages in different types of wireless protocols, the type of wireless radio transmit hardware used for various wireless protocols, processing speeds of a network device and/or its wireless radio transmit hardware, etc. In various embodiments, time to transmit announcement messages may also vary based on channel access and medium access control (MAC) processing times of various wireless protocols. In an example of transmitting a series of announcement messages as described herein, the network device 804 may sequentially transmit eight announcement messages over eight different channels in 2 seconds or less, in 2.5 seconds or less, in 3 seconds or less, in 3.5 seconds or less, in 4 seconds or less, or anywhere in between 2 seconds and 4 seconds.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
    sending, by a first electronic device, a first message over a first channel, the first message comprising a first device identifier of the first electronic device and a channel identifier of the first electronic device;
    receiving, by a second electronic device and over the first channel, the first message;
    identifying, by the second electronic device, the first device identifier from the first message;
    identifying, by the second electronic device, the channel identifier from the first message;
    determining, by the second electronic device, a received signal strength indicator (RSSI) value associated with the first message;
    determining, by the second electronic device, a signal-to-noise ratio (SNR) value associated with the first message;
    determining, by the second electronic device, modulation information of the first message;
    sending, by the second electronic device, a second message to one or more computing devices, the second message comprising the first device identifier, a time at which the first message was received, a second device identifier of the second electronic device, the channel identifier, the RSSI value, the SNR value, and the modulation information; and
    generating, by the one or more computing devices, network connectivity data based at least in part on the second message.

2. The method of claim 1, further comprising:
    sending, by the first electronic device, a third message over a second channel, the third message comprising the first device identifier and the channel identifier;
    receiving, by a third electronic device and over the second channel, the third message; and
    sending, by the third electronic device, a fourth message to the one or more computing devices;
    wherein the generating of the network connectivity data is further based at least in part on the fourth message.

3. The method of claim 2, wherein a first time between the sending of the first message and the sending of the third message is substantially equal to a second time associated with switching from the first channel to the second channel.

4. A method comprising:
    storing first data representing a first device identifier associated with a first electronic device;
    storing second data representing a first channel identifier associated with the first electronic device;
    receiving, by the first electronic device, a first message from a second electronic device, the first message comprising a second device identifier associated with the second electronic device and a second channel identifier associated with the second electronic device;
    determining, by the first electronic device, a signal value associated with the first message; and
    sending, by the first electronic device, a second message to one or more computing devices, the second message comprising the first device identifier, the first channel identifier, a time at which the first message was received, the second device identifier, the second channel identifier, and the signal value.

5. The method of claim 4, further comprising determining, by the first electronic device, that the first message includes a command to send the second message to the one or more computing devices.

6. The method of claim 4, further comprising:
    identifying the first device identifier from a source address of a medium access control (MAC) header of the first message; and
    identifying the first channel identifier from a MAC payload of the first message.

7. The method of claim 4, further comprising:
    receiving, from a third electronic device, third data representing an indication of a detection of an event; and
    receiving, from the third electronic device, fourth data representing a third device identifier associated with the third electronic device.

8. The method of claim 7, wherein the second message further comprises the third device identifier.

9. The method of claim 4, further comprising:
    determining a type associated with the first electronic device,
    wherein the second message further comprises the type.

10. The method of claim 4, wherein the determining the signal value associated with the first message comprises at least one of:
    determining, by the first electronic device, a signal power level associated with the first message; or
    determining, by the first electronic device, a signal-to-noise ratio value associated with the first message.

11. The method of claim 4, further comprising:
    determining modulation information associated with the first message,
    wherein the second message further comprises the modulation information.

12. The method of claim 4, further comprising:
    receiving, by the first electronic device, a third message from the one or more computing devices; and
    sending, by the first electronic device, the third message to the second electronic device.

13. A first electronic device comprising:
one or more processors; and
one or more computer-readable media storing instructions that, when executed by the one or more processors, cause the first electronic device to perform operations comprising:
storing first data representing a first identifier associated with a first electronic device;
storing second data representing a first channel identifier associated with the first electronic device;
receiving, by the first electronic device, a first message from a second electronic device, the first message comprising a second device identifier associated with the second electronic device and a second channel identifier associated with the second electronic device;
determining, by the first electronic device, a signal value associated with the first message; and
sending, by the first electronic device, a second message to one or more computing devices, the second message comprising the first device identifier, the first channel identifier, a time at which the first message was received, the second device identifier, the second channel identifier, and the signal value.

14. The first electronic device of claim 13, the one or more computer-readable media storing further instructions that, when executed by the one or more processors, cause the first electronic device to perform further operations comprising determining that the first message includes a command to send the second message to the one or more computing devices.

15. The first electronic device of claim 13, the one or more computer-readable media storing further instructions that, when executed by the one or more processors, cause the first electronic device to perform further operations comprising:
identifying the first device identifier from a source address of a medium access control (MAC) header of the first message; and
identifying the first channel identifier from a MAC payload of the first message.

16. The first electronic device of claim 13, the one or more computer-readable media storing further instructions that, when executed by the one or more processors, cause the first electronic device to perform further operations comprising:
receiving, from a third electronic device, third data representing at least an indication of a detection of an event; and
receiving, from the third electronic device, fourth data representing a third device identifier associated with the third electronic device.

17. The first electronic device of claim 16, wherein the second message further comprises the third device identifier.

18. The first electronic device of claim 13, the one or more computer-readable media storing further instructions that, when executed by the one or more processors, cause the first electronic device to perform further operations comprising:
determining a type associated with the first electronic device,
wherein the second message further comprises the type.

19. The first electronic device of claim 13, wherein the determining the signal value associated with the first message comprises at least one of:
determining a signal power level associated with the first message; or
determining a signal-to-noise ratio value associated with the first message.

20. The first electronic device of claim 13, the one or more computer-readable media storing further instructions that, when executed by the one or more processors, cause the first electronic device to perform further operations comprising:
determining modulation information associated with the first message,
wherein the second message further comprises the modulation information.

* * * * *